June 14, 1949. W. J. BAUROTH 2,473,130
ELECTRIC TRACTION MOTOR
Filed Sept. 5, 1947 2 Sheets-Sheet 2
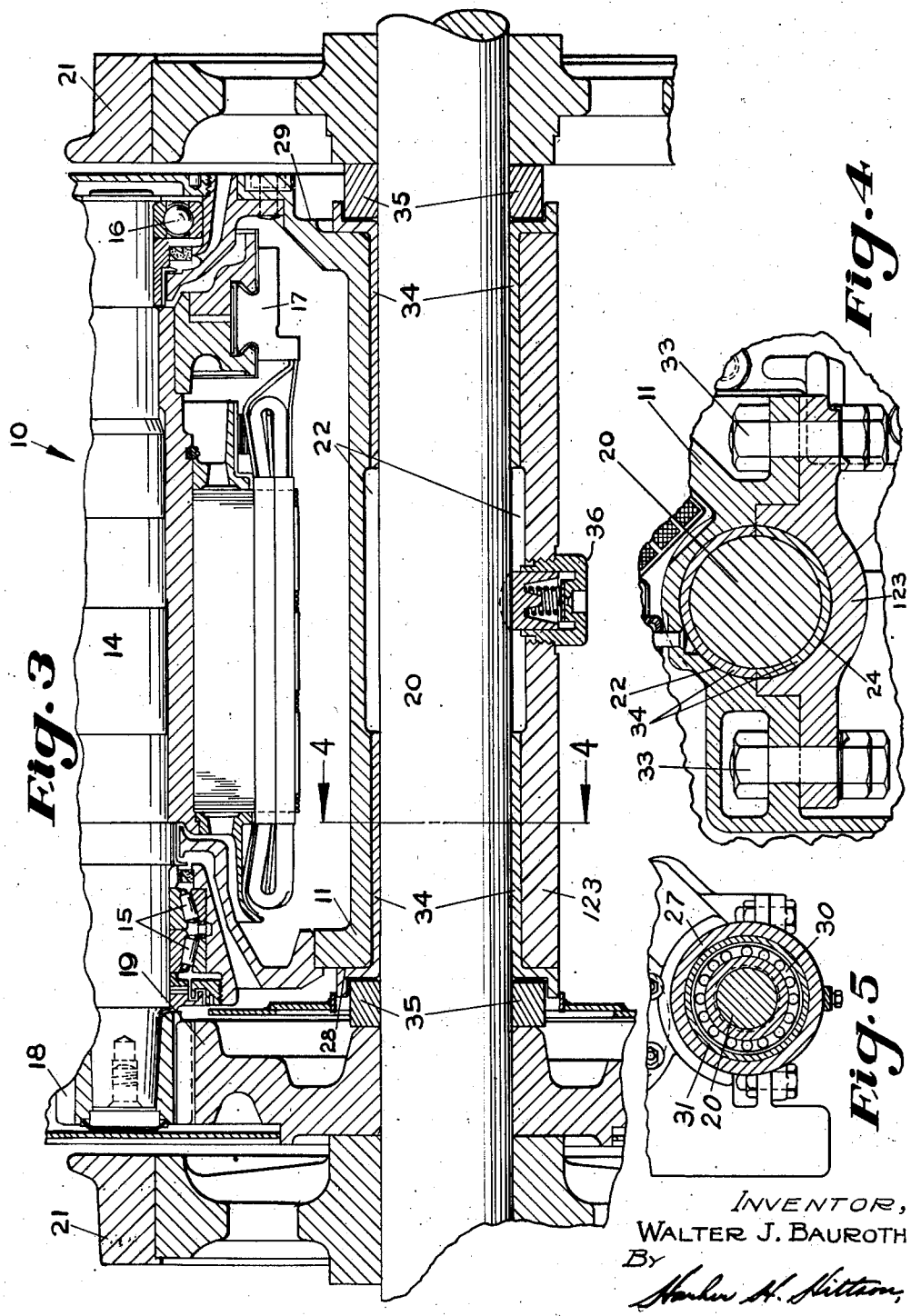
INVENTOR,
WALTER J. BAUROTH
By
ATT'Y Patented June 14, 1949

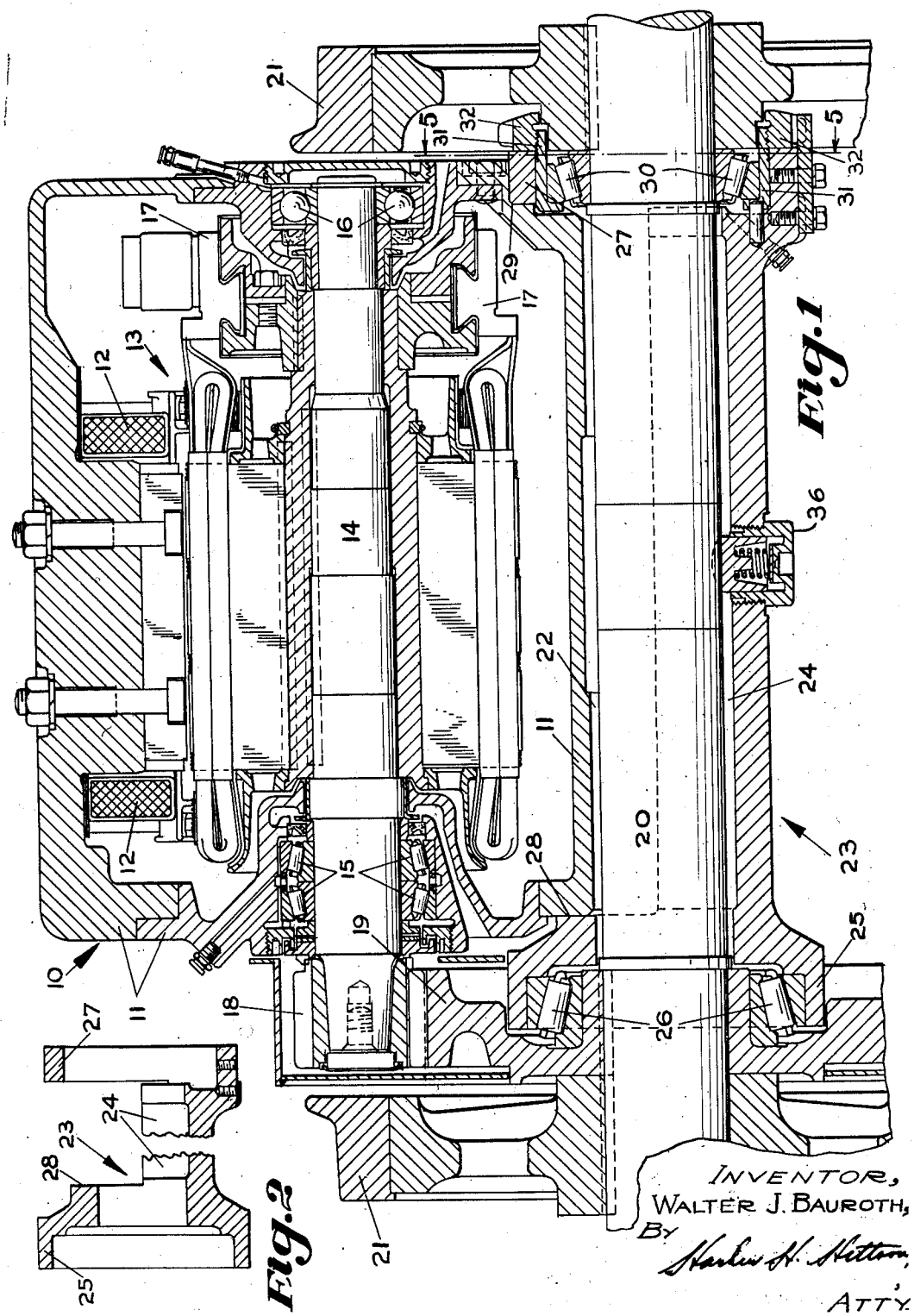

2,473,130

UNITED STATES PATENT OFFICE 2,473,130

ELECTRIC TRACTION MOTOR

Walter J. Bauroth, Columbus, Ohio, assignor to The Jeffrey Manufacturing Company, a corporation of Ohio Application September 5, 1947, Serial No. 772,360

9 Claims. (Cl. 172—286)

This invention relates to an electric traction motor, and an object of the invention is to provide such a motor with a main frame so constructed that sleeve type or journal bearings on the one hand, or anti-friction bearings, such as roller bearings, on the other hand, may be selectively used to support the wheel shaft or axle of a locomotive truck.

A further object of the invention is to provide improved housing construction for an electric motor adapted to cooperate with selective caps to support the wheel shaft on journal bearings, such as bronze sleeve bearings, or on anti-friction bearings, such as roller bearings.

Another object of the invention is to provide an electric traction motor and wheel shaft assembly of improved construction in which there are anti-friction bearings mounted directly on a removable cap, the bearings being carried entirely by said cap, the cap having means including a plain ring with bearing surfaces cooperating with the frame housing to insure its proper positioning thereon.

Another object of the invention is to provide an improved bearing cap construction for a traction motor.

Other objects of the invention will appear hereinafter, the novel features and combinations being set forth in the accompanying claims.

In the accompanying drawings,

Fig. 1 is a sectional view through a mine locomotive incorporating the features of my invention and showing an associated locomotive truck or wheel shaft or axle mounted on anti-friction bearings;

Fig. 2 is a sectional view of the bearing cap of Fig. 1, with parts broken away;

Fig. 3 is a view similar to Fig. 1, showing only a portion of the motor, with the axle mounted in journal bearings, such as bronze sleeves;

Fig. 4 is a sectional view taken on the line 4—4 of Fig. 3, looking in the direction of the arrows; and Fig. 5 is a sectional view taken on the line 5—5 of Fig. 1, looking in the direction of the arrows.

In the construction of electric traction motors for electric locomotives, such as mine locomotives, it has always been desirable to mount the wheel shafts or axles on bearings which are spaced as far apart as is possible. In order to do this it has been the practice for years to provide different main frames for electric traction motors which were to have anti-friction bearings on the one hand and sleeve or journal bearings on the other hand. In order to eliminate this necessity of two distinct main frames and yet to provide a main frame construction for an electric traction motor which can selectively support or receive the truck axle and mount it on anti-friction bearings in the one case, or sleeve bearings in the other, is the outstanding characteristic of the invention here involved.

In Fig. 1 of the drawings the electric motor is illustrated driving a truck axle in which the truck axle is mounted on anti-friction bearings. Briefly described, the salient parts are a motor 10 having a main frame 11 providing the iron for the flux of the electric motor and carrying field coils 12. Motor 10 also includes armature or rotor 13 mounted for rotation on armature shaft 14 which is carried in spaced bearings 15 and 16 received in cups in the main frame 11. The motor is illustrated as of the direct current type and includes a commutator 17. The shaft 14 projects from the main frame 11 on one side and is provided with a spur gear 18 which meshes with a driving gear 19 keyed to an axle or final drive shaft 20, which carries traction wheels 21 on opposite ends thereof.

It is standard practice in traction type electric motors to make them the maximum axial distance or length permitted by the distance between the traction wheels. In other words, the clearance between the wheels is the limiting factor in one dimension of the motor. This condition prevails in the instant case as it is noted that on one side the main frame 11 is close to a wheel 21, while on the other side the projecting shaft end and spur gear 18 are close to the other wheel.

It is desirable to mount the axle or shaft 20 in bearings spaced apart as much as possible. To this end, the main frame 11 is provided with a transverse recess or groove 22 through which the axle 20 extends and is free to rotate by being spaced therefrom. As clearly illustrated in Fig. 4 of the drawings, the groove 22 is of generally semi-cylindrical shape.

Cooperating with the main frame 11 to provide a generally cylindrical enclosure surrounding the shaft 20 is a bearing cap 23, the central part of which has a generally semi-cylindrical groove portion 24 which is complementary with the main frame groove 22 to provide a substantially complete cylindrical housing for said shaft 20. At the left-hand end, as viewed in Figs. 1 and 2 of the drawings, the bearing cap 23 is provided with a flanged ring 25 which has a slightly larger diameter than the diameter of the central portion of the cap 23 and which provides a cup for receiving an anti-friction roller bearing 26 which cooperates with the hub of the gear 19 to provide anti-friction support for the shaft 20 adjacent one end. Adjacent the other end, or the right-hand end, as viewed in Figs. 1 and 2 of the drawings, the cap 23 is provided with a plain ring 27. That is, this portion of the cap 23 is in the form of a ring and this ring is separate from the main body of the cap 23 over a circumference of at least 180°. The ring is plain instead of flanged and in the claims wherein a plain ring is defined it is to be understood as meaning a ring, the cross-section of which is such as to produce no flange or interior bearing surface in a plane perpendicular to the axis of the cap. The lower portion of the ring 27, as viewed in Fig. 2, is, of course, formed integral with the main body of the cap 23 and is truly a part thereof.

As clearly illustrated in Fig. 1 of the drawings, the flanged ring 25 at the left-hand side of the cap 23 has a surface designated 28 which is a bearing surface extending through approximately 180° and has direct bearing contact with a surface of the main frame 11.

The ring 27 at the right-hand end of the cap 23 is received in a semi-cylindrical curved groove or recess 29 formed in the main frame 11 adjacent the right hand side of groove 22, which has right angle bearing surfaces extending over approximately 180°. Therefore, the semi-cylindrical portion of ring 27 which extends over 180° fits into the semi-cylindrical groove 29 which also extends over 180°. The ring 27 has peripheral or circumferential contact with the cylindrical bearing surface provided by the groove 29 and has lateral or axial contact with the face of said groove which is parallel with a plane perpendicular to the axis of the shaft 20.

The ring 27 throughout its circumference of 360° receives an adjustable anti-friction bearing 30 which may be adjusted by a sleeve 31 and adjusting nut 32 which is threaded thereon. This provides for simultaneous adjustment of the two bearings 26 and 30 with respect to the shaft 20.

The cap 23 is removably attached to the main frame 11 by a plurality of spaced bolts and nuts 33, two of which are seen in Fig. 4 of the drawings, there being a pair of said bolts and nuts at each end of the cap 23.

It is to be noted that in this arrangement the bearings 26 and 30 which support the shaft 20 are carried entirely by the rings 25 and 27 of the cap 23. Also that while ring 27 has bearing contact with the frame 10 at the bearing surfaces of groove 29, ring 25 is spaced from frame 10 except for the lateral bearing at surface 28. Thus the shear load on bearing 26 is transmitted to the frame 10 from ring 25 only through the body of cap 23 which is rigidly attached thereto. The contact between ring 27 and the bearing surfaces of groove 29 insure proper positioning of cap 23 and thus shaft 20 relative to frame 10. In view of the fact that the bearings 26, 30 are carried entirely directly on the cap 23, shaft 20 can be mounted in said cap and the bearings 26, 30 adjusted independently of whether cap 23 is mounted on motor frame 10 or removed therefrom. Therefore, no bearing adjustment is involved in removing or replacing cap 23.

In Fig. 3 of the drawings the axle 20 is shown mounted on journal bearings, such as bronze sleeves 34, these being split type cylindrical bronze bushings, half of each of which is carried in the main frame 10, the other half in a cap 123 which differs from the cap 23 in that it has no structure comparable with the two end rings 25 or 27, but is designed to receive half of each of the journal bearings 34.

As clearly illustrated in the drawings, the groove 22 is so formed as to receive half of each sleeve bearing 34 whenever the axle 20 is to be mounted on bearings of this type. When the axle 20 is mounted on anti-friction bearings the sleeve bearings 34 are, of course, omitted, leaving a clearance between the shaft 20 and the main frame 11 adjacent the groove 22. When the journal bearings 34 are employed, spacer rings 35 are placed on the shaft 20 so as to take the axial thrust between the main frame 11 and the wheels 21. The wheels 21 are, of course, rigidly attached to the shaft 20 by shrinking or the like.

Each cap 23 and 123 preferably also has a center electric current grounding device 36 such as disclosed in full and claimed in Beltz Patent No. 1,933,651, dated November 7, 1933.

From the above description it is evident that a single construction of main frame is adapted to receive selectively either anti-friction bearings or sleeve type journal bearings for mounting the wheel axle 20. This is a standardization feature of considerable significance in the traction electric motor art.

Obviously those skilled in the art may make various changes in the details and arrangement of parts without departing from the spirit and scope of the invention as defined by the claims hereto appended and I therefore wish not to be restricted to the precise construction herein disclosed.

Having thus described and shown an embodiment of my invention, what I desire to secure by Letters Patent of the United States is:

1. An electric locomotive motor including a frame housing an electric motor, said frame having means providing a transverse groove of generally semi-cylindrical shape adapted to cooperate selectively with either of two caps to support a shaft either in journal bearings or anti-friction bearings, said frame being formed adjacent said groove to receive spaced journal bearings of generally semi-cylindrical shape, said frame also being formed adjacent one end of said groove to provide bearing surfaces at right angles to each other extending for approximately 180 degrees and adapted to receive a plain ring portion of a cap and to have direct contact therewith over a circumferential and a lateral face thereof extending for approximately 180 degrees.

2. An electric locomotive motor including a frame housing an electric motor, said frame having means providing a transverse groove of generally semi-cylindrical shape adapted to cooperate selectively with either of two caps to support a shaft either in journal bearings or anti-friction bearings, said frame being formed adjacent said groove to receive spaced journal bearings of generally semi-cylindrical shape, said frame also being formed adjacent one end of said groove to provide bearing surfaces at right angles to each other extending for approximately 180 degrees and adapted to receive a ring portion of a cap and to have direct contact therewith over a circumferential and a lateral face thereof extending for approximately 180 degrees.

3. An electrical traction motor including a frame having a wheel shaft receiving recess extending thereacross, said recess having sleeve bearing receiving areas at its opposite ends, and a curved groove at one end of said recess having bearing surfaces parallel and perpendicular to the axis of said recess and adapted to receive and hold a plain ring and have bearing contact peripherally and axially therewith.

4. An electrical traction motor including a frame having a wheel shaft receiving recess extending thereacross, said recess having sleeve bearing receiving areas at its opposite ends, and a curved groove at one end of said recess having bearing surfaces parallel and perpendicular to the axis of said recess and adapted to receive and hold a ring and have bearing contact peripherally and axially therewith.

5. An electrical traction motor assembly including a motor frame, a wheel axle, means providing a transverse recess in said frame through which said axle extends, said recess having sleeve bearing supporting areas at its opposite ends, a cap attached to said frame and cooperating with said recess to provide a cylindrical enclosure for a portion of said shaft, said cap having a flanged ring at one end encircling said shaft and a plain ring at the other end also encircling said shaft, and anti-friction bearings for said shaft, one in each of said rings, said plain ring having a portion extending over approximaately 180 degrees fitting in a curved recess in said frame adjacent said aforementioned recess.

6. An electrical traction motor assembly including a motor frame, a wheel axle, means providing a transverse recess in said frame through which said axle extends, said recess having sleeve bearing supporting areas at its opposite ends, a cap attached to said frame and cooperating with said recess to provide a cylindrical enclosure for a portion of said shaft, said cap having a flanged ring at one end encircling said shaft and a plain ring at the other end also encircling said shaft, and anti-friction bearings for said shaft, one in each of said rings.

7. A bearing cap for a traction locomotive including a body having a generally semi-cylindrical shape with a complete bearing receiving ring formed at each end, one of said rings being flanged throughout substantially its entire circumference, the other being plain throughout at least approximately 180 degrees of its circumference.

8. A bearing cup for a traction locomotive including a body having a generally semi-cylindrical shape with a complete bearing receiving ring formed at each end, at least one of said rings being plain for at least approximately 180 degrees of its circumference.

9. A traction motor and axle assembly including a driving motor, a wheeled axle driven thereby, gearing interconnecting said motor and axle, mounting means for said axle including motor frame means providing a transverse axle receiving groove, said frame means providing a semi-cylindrical groove at one end of said transverse groove, which semi-cylindrical groove has bearing surfaces, a bearing cap having an axle receiving groove, means attaching said bearing cap to said frame whereby said frame groove and bearing cap groove cooperate to receive said axle, complete integral bearing rings at opposite ends of said cap, and bearings in said ring rotatably mounting said axle directly to said cap at opposite ends thereof, one of said bearing rings being in part a plain unflanged ring having bearing contact with said frame by having bearing contact with said bearing surfaces adjacent said semi-cylindrical groove, the frame and other bearing ring being so constructed that said other bearing rings is spaced from said frame throughout its entire circumference.

WALTER J. BAUROTH.

REFERENCES CITED

The following references are of record in the file of this patent:

UNITED STATES PATENTS

| Number | Name | Date |
| --- | --- | --- |
| 1,424,315 | Moore | Aug. 1, 1922 |
| 1,967,854 | Aydelott | July 24, 1934 |
| 2,023,846 | Levin | Dec. 10, 1935 |
| 2,381,324 | Wagner et al. | Aug. 7, 1945 |
| 2,412,853 | Alben | Dec. 17, 1946 |